No. 850,559. PATENTED APR. 16, 1907.
C. C. BRABANT.
WHEEL.
APPLICATION FILED FEB. 10, 1906.
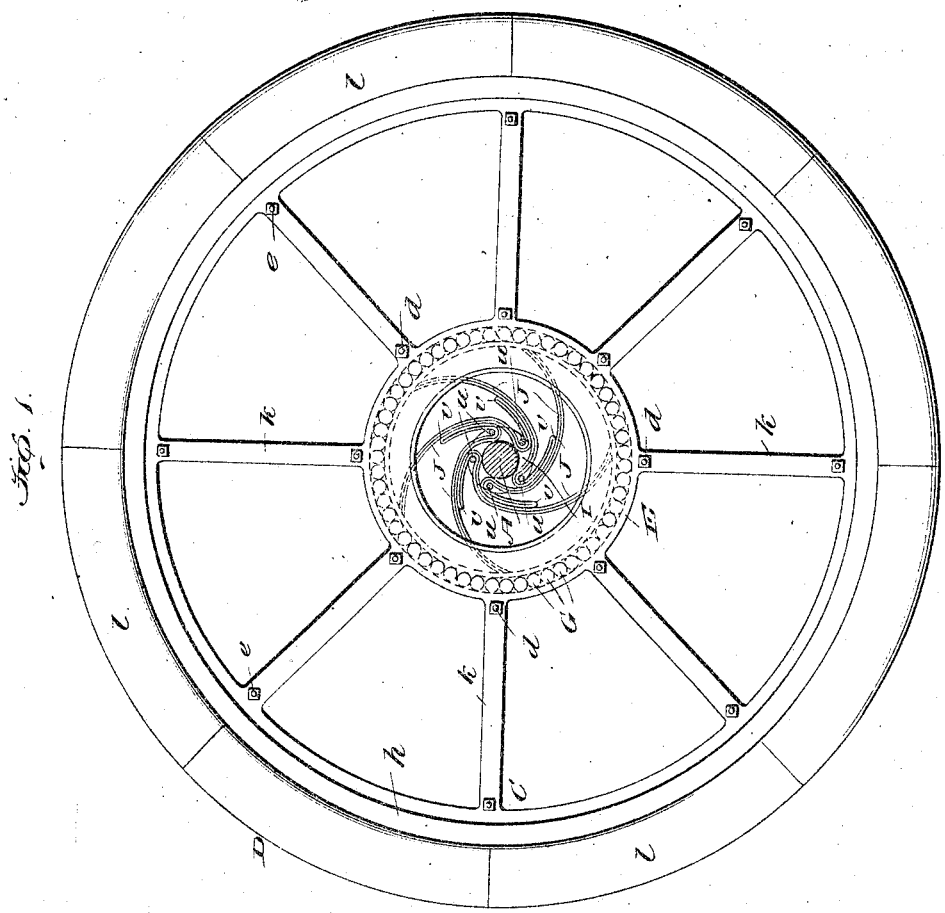
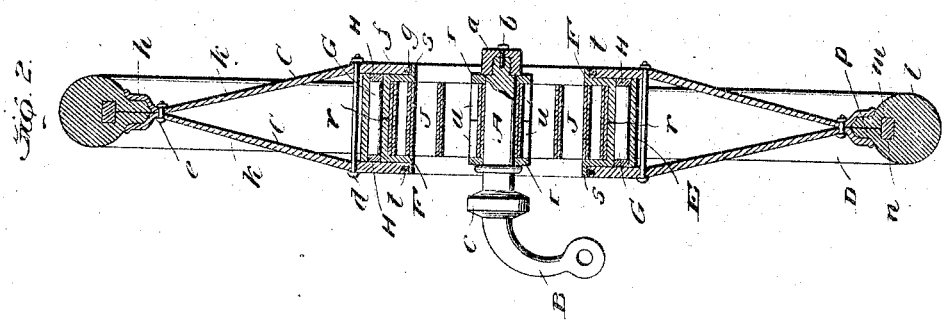
WITNESSES:
INVENTOR
Charles C. Brabant
By James J. Sheehy
Attorney

UNITED STATES PATENT OFFICE.

CHARLES C. BRABANT, OF ALPENA, MICHIGAN.

WHEEL.

No. 850,559.　　　Specification of Letters Patent.　　Patented April 16, 1907.

Application filed February 10, 1906. Serial No. 300,531.

*To all whom it may concern:*

Be it known that I, CHARLES C. BRABANT, a citizen of the United States, residing at Alpena, in the county of Alpena and State of Michigan, have invented new and useful Improvements in Wheels, of which the following is a specification.

My invention pertains to vehicle-wheels, more particularly wheels designed for use on motor-vehicles; and it has for one of its objects to provide a wheel having a solid tire made up of a plurality of segmental sections and constructed with a view of permitting of any one of the sections being removed with facility and replaced with a new section when necessity demands.

Another object of the invention is the provision of a vehicle-wheel embodying efficient means for preventing the transmission of shock and jar to the axle on which the wheel is mounted while reducing the friction attendant on rotation of the wheel to a minimum.

Another object is the provision of a wheel constructed with a view of precluding the entry of dust and dirt to the antifriction devices.

Another object is the provision in a vehicle-wheel of springs for preventing the transmission of shock and jar to the axle, the said springs being so constructed that they are rendered strong and durable and their resiliency is increased at one and the same time.

Another object is the provision of a wheel embodying sections susceptible of being made of pressed steel or analogous material.

Other advantageous features of the invention will be fully understood from the following description and claims when the same are considered in connection with the accompanying drawings, forming part of this specification, in which—

Figure 1 is a side elevation of the wheel constituting the present and preferred embodiment of my invention, the same being shown with its central part in section to illustrate the arrangement of the cushioning-springs relative to the axle. Fig. 2 is a view illustrating the wheel in diametrical section and the axle partly in elevation and partly in section.

Similar letters designate corresponding parts in both views of the drawings, referring to which—

A is an axle equipped with a nut $a$ and a screw $b$ for preventing casual displacement of the nut and provided at $c$ with a shoulder designed to offer an abutment to the wheel, as shown in Fig. 2. The said axle A is shown as part of a steering-knuckle B; but it is obvious that it may be carried by an axle-body or any other suitable device without in any way affecting my invention.

C C are the annular body-sections of my novel wheel. These annular body-sections are preferably formed of pressed steel, are detachably connected together by an inner series of transverse bolts $d$ and an outer series of transverse bolts $e$, and are respectively made up of an inner circular portion $f$, having a groove or channel $g$ in its inner edge, a rim portion $h$, and spoke portions $k$, interposed between and connecting the inner circular portion $f$ and the rim portion $h$. By virtue of the body C being constructed in the manner described it will be apparent that the sections thereof may be readily disconnected when it is necessary to remove one of the sections of the tire, presently described, and replace the same with a new section.

D is the tire as a whole. The said tire comprises a suitable number of segmental sections $l$, of rubber or analogous material, arranged end to end around the body C, and a hoop $m$, of steel or other suitable material, inclosed in the tire-sections $l$ and having for its purpose to retain the said tire-sections under normal conditions in proper position relative to the body C. Each of the tire-sections $l$ is provided with a bore $n$, preferably of rectangular form in cross-section, and is also provided with inwardly-extending reduced portions $p$, which when spread apart permit of the hoop $m$ being positioned in the bore $n$. The hoop $m$ is of the same shape in cross-section as the bore $n$ in order to enable it to better hold the sections $l$ against lateral flexing or movement, and it will be apparent that when the hoop $m$ is arranged in the tire-sections $l$ and the reduced inner portions $p$ of the tire-sections are positioned in the rim of the body C there is no liability of any one of the tire-sections casually working loose or becoming displaced. When, however, a sufficient number of the bolts $e$ are removed and one of the rim portions $h$ is moved away from the other, one inner reduced portion $p$ of the tire-section that it is desired to remove may be readily withdrawn from the rim, after which the said tire-section as a whole may be disengaged from the rim and the retaining-hoop. With like facility a new tire-section $l$ may be placed in engagement with the hoop $m$ and the rim of the body C and secured in the position illustrated in Fig. 2, and in this way the usefulness of the tire as an entirety may be materially prolonged.

E, Fig. 2, is an annular shell, preferably of pressed steel, held between the inner portions $f$ of the body-sections and arranged within the inner circular series of transverse bolts $d$.

F F are sections, preferably of pressed steel, which meet at $r$ and have flanges $s$ disposed adjacent to the inner edges of the body portions $f$. The sections F serve, in combination with the shell E, to form a race for antifriction devices, presently described, and in order to effectually exclude dust from the said race I arrange annular washers $t$, of felt or other suitable packing material, in the grooves or channels $g$ so as to bear against the flanges $s$ of sections F, as shown in Fig. 2.

The antifriction devices employed in my novel wheel may be of any type compatible with my invention, although I prefer to employ rollers G, disposed between and bearing against the shell E and the sections F and retaining-rings H, in which the ends of the said rollers are journaled, the said rollers and rings being clearly illustrated in Fig. 2.

In addition to the elements enumerated my novel wheel comprises rings I, mounted on the axle A and having inwardly-directed fingers $u$, which preferably meet, as shown in Fig. 2, and springs J, which have for their purpose to prevent the transmission of shock and jar from the body of the wheel to the axle. There are preferably five of the springs J, and each spring is formed of a single strip of material bent upon itself and is looped about one pair of fingers $u$ and is arranged with its bight portion $v$ lapped or laid against the outer portion of the next forward spring after the manner shown in Fig. 1. By virtue of the springs being constructed in this manner it is claimed that their strength and durability is increased, and at the same time they are rendered highly resilient and are enabled to efficiently serve the purpose hereinbefore ascribed to them.

By virtue of the sections F being of annular form, it will be noted that the springs J are exposed to view at opposite sides of the wheel. This contributes to the lightness of the wheel and at the same time does not impair the operation of the springs J, since they are not liable to be affected by the deposit of dust and dirt thereon. It will be noted, however, that notwithstanding the exposure of the springs J dust and dirt are effectually prevented from finding their way into the race or casing in which the antifriction devices are contained.

It will be gathered from the foregoing that in addition to efficiently cushioning a vehicle-body my novel wheel is strong and durable and is well adapted to withstand the hard usage to which the wheels of motor-vehicles are ordinarily subjected.

Having described my invention, what I claim, and desire to secure by Letters Patent, is—

1. A wheel comprising body-sections detachably connected together and having inner angular portions, rim portions, and spoke portions connecting said inner portions and the rim-body, an annular shell arranged and secured between the inner annular portions of the body-sections, annular sections arranged between the inner annular portions of the body-sections and having flanges opposed to the inner edges of said inner annular portions, packing interposed between said flanges and edges, antifriction devices arranged in the race or casing formed between the annular shell and the annular section, a portion adapted to receive an axle, and cushioning means interposed between said portion and the annular sections.

2. In a wheel, the combination of a central portion arranged to receive an axle and having spring-holding devices, an annular body, an annular section arranged therein, antifriction devices interposed between the body and section, and springs interposed between the central portion and the annular section; the said springs being respectively formed of a strip of material bent upon itself, and each spring being looped to receive one of the spring-holding devices and having its bight portion laid or lapped against the outer portion of the next spring.

3. The combination in a wheel, of a central portion arranged to receive an axle and having spring-holding devices, an annular section surrounding the central portion, and springs interposed between the central portion and the annular section; the said springs being respectively formed of a strip of material bent upon itself, and each spring being looped to receive one of the spring-holding devices and having its bight portion laid or lapped against the outer portion of the next spring.

In testimony whereof I have hereunto set my hand in presence of two subscribing witnesses.

CHARLES C. BRABANT.

Witnesses:
W. A. PRINCE,
JOHN R. McHARG.